US009436045B2

(12) United States Patent
Song et al.

(10) Patent No.: US 9,436,045 B2
(45) Date of Patent: Sep. 6, 2016

(54) LIQUID CRYSTAL DISPLAY

(71) Applicant: SAMSUNG DISPLAY CO., LTD., Yongin, Gyeonggi-Do (KR)

(72) Inventors: Heerim Song, Seoul (KR); Sang-Uk Lim, Yongin-si (KR); Sangjin Jeon, Suwon-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 190 days.

(21) Appl. No.: 14/474,538

(22) Filed: Sep. 2, 2014

(65) Prior Publication Data

US 2015/0268517 A1   Sep. 24, 2015

(30) Foreign Application Priority Data

Mar. 19, 2014   (KR) .................. 10-2014-0032331

(51) Int. Cl.
| | |
|---|---|
| *G02F 1/1343* | (2006.01) |
| *G02F 1/1362* | (2006.01) |
| *G02F 1/1368* | (2006.01) |
| *G02F 1/1337* | (2006.01) |

(52) U.S. Cl.
CPC ..... *G02F 1/134309* (2013.01); *G02F 1/13624* (2013.01); *G02F 1/1368* (2013.01); *G02F 1/133707* (2013.01); *G02F 2001/134345* (2013.01)

(58) Field of Classification Search
CPC .................................................. G02F 1/13409
See application file for complete search history.

(56) References Cited

U.S. PATENT DOCUMENTS

| | | | |
|---|---|---|---|
| 7,342,629 B2 | 3/2008 | Yoshida et al. | |
| 7,499,133 B2 | 3/2009 | Hsu et al. | |
| 7,583,346 B2 | 9/2009 | Hsieh et al. | |
| 7,705,924 B2 * | 4/2010 | Kim | G09G 3/006 324/760.01 |
| 7,719,623 B2 | 5/2010 | Hsieh et al. | |
| 8,264,651 B2 | 9/2012 | Cho et al. | |
| 8,379,176 B2 | 2/2013 | Kim et al. | |
| 2003/0071952 A1 * | 4/2003 | Yoshida | G02F 1/134363 349/141 |
| 2008/0284929 A1 * | 11/2008 | Kimura | G02F 1/13624 349/38 |
| 2010/0259712 A1 | 10/2010 | Jeong et al. | |
| 2011/0222004 A1 | 9/2011 | Kim | |
| 2012/0075542 A1 | 3/2012 | Kim et al. | |
| 2012/0133872 A1 | 5/2012 | Kim et al. | |

(Continued)

FOREIGN PATENT DOCUMENTS

| | | |
|---|---|---|
| JP | 2002-196334 A | 7/2002 |
| JP | 2004-037854 A | 2/2004 |

(Continued)

*Primary Examiner* — Timothy L Rude
(74) *Attorney, Agent, or Firm* — Lee & Morse, P.C.

(57) ABSTRACT

A liquid crystal display includes a pixel that includes a first sub-pixel chargeable with a first voltage and a second sub-pixel chargeable with a second voltage different from the first voltage, a pixel electrode that includes a first sub-pixel electrode in the first sub-pixel and a second sub-pixel electrode in the second sub-pixel, a common electrode that faces the pixel electrode, and a liquid crystal layer between the pixel electrode and the common electrode. The first sub-pixel electrode includes a first trunk portion and a plurality of first branch portions protruding from and extending from one side of the first trunk portion. The second sub-pixel electrode includes a second trunk portion and a plurality of second and third branch portions that protrude from both sides of the second trunk portion and extend substantially parallel to the first branch portions.

19 Claims, 12 Drawing Sheets

(56) References Cited

U.S. PATENT DOCUMENTS

| | | | |
|---|---|---|---|
| 2012/0223931 A1 | 9/2012 | Tashiro et al. | |
| 2013/0002625 A1* | 1/2013 | Liao | G02F 1/134309 345/205 |
| 2014/0063428 A1* | 3/2014 | Lee | G02F 1/13439 349/139 |
| 2014/0132874 A1* | 5/2014 | Jang | G02F 1/134309 349/44 |
| 2014/0168582 A1* | 6/2014 | Chang | G02F 1/134309 349/106 |
| 2014/0267962 A1* | 9/2014 | Jung | G02F 1/134363 349/33 |
| 2015/0042939 A1* | 2/2015 | Park | G02F 1/134336 349/144 |
| 2015/0098047 A1* | 4/2015 | Shin | G02F 1/133707 349/106 |
| 2016/0116775 A1* | 4/2016 | Kim | G02F 1/1341 349/43 |

FOREIGN PATENT DOCUMENTS

| | | |
|---|---|---|
| JP | 2005-018098 A | 1/2005 |
| JP | 2006-084518 A | 3/2006 |
| JP | 2007-094255 A | 4/2007 |
| KR | 10-2008-0022355 A | 3/2008 |
| KR | 10-2009-0089655 A | 8/2009 |
| KR | 10-2009-0103461 A | 10/2009 |
| KR | 10-2009-0118391 A | 11/2009 |
| KR | 10-2010-0056613 A | 5/2010 |
| KR | 10-2012-0124012 A | 11/2012 |
| KR | 10-2015-0019131 A | 2/2015 |
| KR | 10-2015-0125144 A | 11/2015 |

* cited by examiner

LIQUID CRYSTAL DISPLAY

CROSS-REFERENCE TO RELATED APPLICATION

Korean Patent Application No. 10-2014-0032331, filed on Mar. 19, 2014, in the Korean Intellectual Property Office, and entitled: "Liquid Crystal Display," is incorporated by reference herein in its entirety.

BACKGROUND

1. Field

Embodiments relate to a liquid crystal display.

2. Description of the Related Art

A liquid crystal display includes two transparent substrates and a liquid crystal layer disposed between the two substrates. The liquid crystal display drives liquid crystal molecules of the liquid crystal layer and controls a transmittance of light passing through the liquid crystal layer in pixels, thereby displaying a desired image.

SUMMARY

Embodiments are directed to a liquid crystal display, including a pixel that includes a first sub-pixel chargeable with a first voltage and a second sub-pixel chargeable with a second voltage different from the first voltage; a pixel electrode that includes a first sub-pixel electrode in the first sub-pixel and a second sub-pixel electrode in the second sub-pixel; a common electrode that faces the pixel electrode; and a liquid crystal layer between the pixel electrode and the common electrode. The first sub-pixel electrode includes a first trunk portion and a plurality of first branch portions protruding from and extending from one side of the first trunk portion. The second sub-pixel electrode includes a second trunk portion and a plurality of second and third branch portions that protrude from both sides of the second trunk portion and extend substantially parallel to the first branch portions.

The second branch portions may have a length shorter than a length of the third branch portions.

End portions of the first branch portions may face end portions of the second branch portions in a one-to-one correspondence.

Each of the second branch portions may have a length shorter than a length of a corresponding first branch portion of the first branch portions.

A width of the second trunk portion may be equal to a length of each of the second branch portions.

The second trunk portion may extend in a direction crossing the second and third branch portions.

The first voltage may have a voltage level higher than a voltage level of the second voltage.

The pixel may include a plurality of domains having different alignment directions of liquid crystal molecules of the liquid crystal layer. The first, second, and third branch portions may extend in different directions according to each domain.

The domains may include first, second, third, and fourth domains. First, second, and third branch portions of each of the first, second, third, and fourth domains may extend in first, second, third, or fourth directions different from each other.

The first trunk portion may include a cross portion having a cross shape and a plate portion having a quadrangular shape with four sides substantially perpendicular to the first, second, third, and fourth directions, respectively.

The common electrode may include a slit having a cross shape.

The slit may overlap with the cross portion of the first trunk portion when viewed in a plan view.

The second sub-pixel electrode may surround at least a portion of the first sub-pixel electrode.

The first and second sub-pixel electrodes may cover at least a portion of a quadrangular shape having chamfered corners.

The first, second, third, and fourth domains may form one domain unit. The domain unit may be provided in a plural number in one pixel.

The liquid crystal display may further include a plurality of gate lines and a plurality of data lines. The pixel may be connected to a corresponding gate line of the gate lines and a corresponding data line of the data lines.

The pixel may include a first thin film transistor that applies the first voltage to the first sub-pixel electrode and a second thin film transistor that applies the second voltage to the second sub-pixel electrode, the first thin film transistor being connected to one gate line of the gate lines and one data line of the data lines, and the second thin film transistor being connected to the one gate line of the gate lines and another data line of the data lines, the another data line being not connected to the first thin film transistor.

The first sub-pixel may include a first thin film transistor to apply a first data voltage to the first sub-pixel electrode and a first liquid crystal capacitor connected to the first thin film transistor. The second sub-pixel may include a second thin film transistor to apply a second data voltage to the second sub-pixel, a second liquid crystal capacitor connected to the second thin film transistor, and a third thin film transistor substantially and simultaneously turned on with the second thin film transistor to apply a storage voltage to the second sub-pixel electrode. The second sub-pixel electrode may be applied with a voltage divided by a resistance of the turn-on resistor of the second and third thin film transistors.

The first sub-pixel may include a first thin film transistor to apply a first pixel voltage to the first sub-pixel electrode and a first liquid crystal capacitor connected to the first thin film transistor. The second sub-pixel may include a second thin film transistor to apply a second pixel voltage to the second sub-pixel, a second liquid crystal capacitor connected to the second thin film transistor, a third thin film transistor turned on at a different time point from the second thin film transistor, and a coupling capacitor electrically connected to the second liquid crystal capacitor when the third thin film transistor is turned on to lower a voltage charged in the second liquid crystal capacitor.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
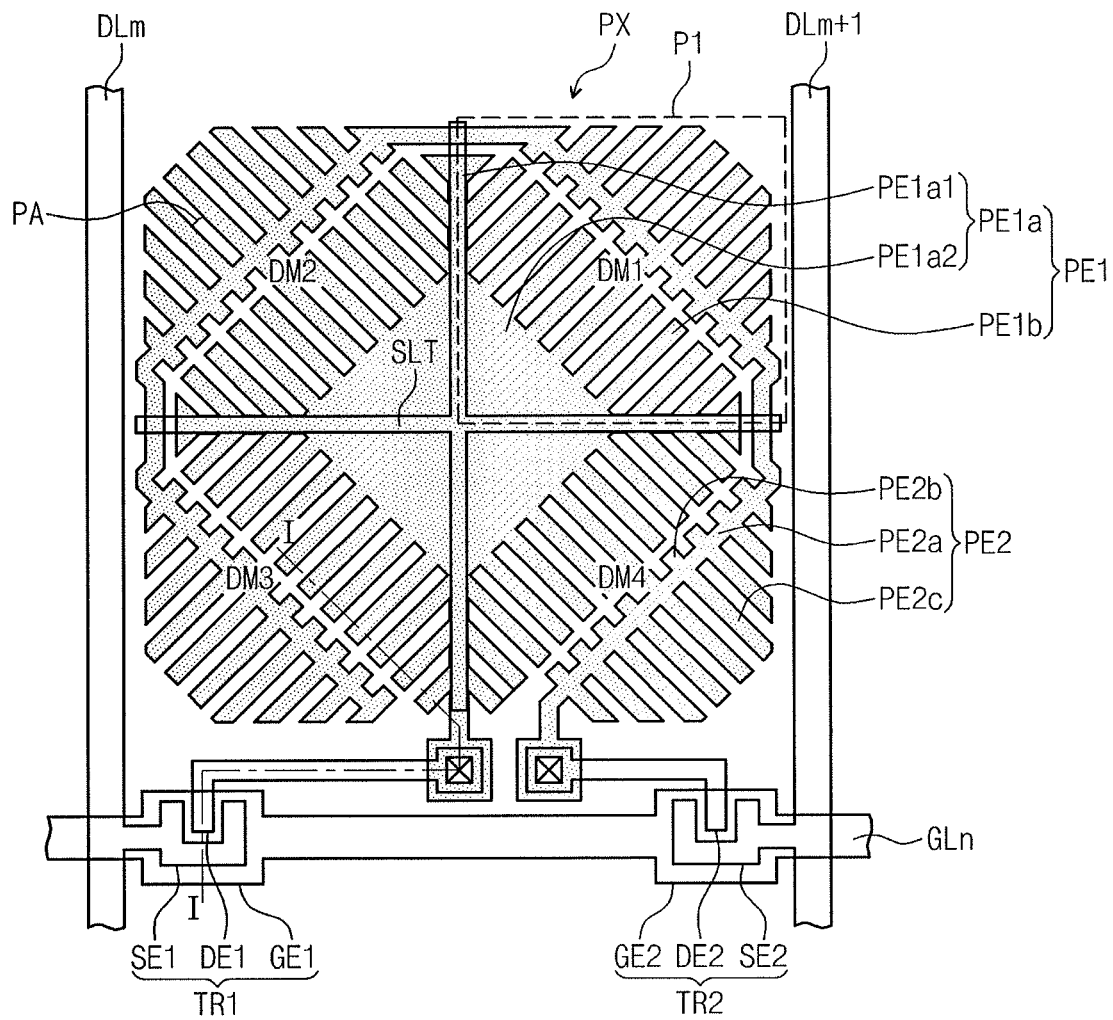
FIG. 1 illustrates a layout diagram showing a pixel according to an exemplary embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer or element is referred to as being "between" two layers or elements, it can be the only layer or element between the two layers or elements, or one or more intervening layers or elements may also be present. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings thereof.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
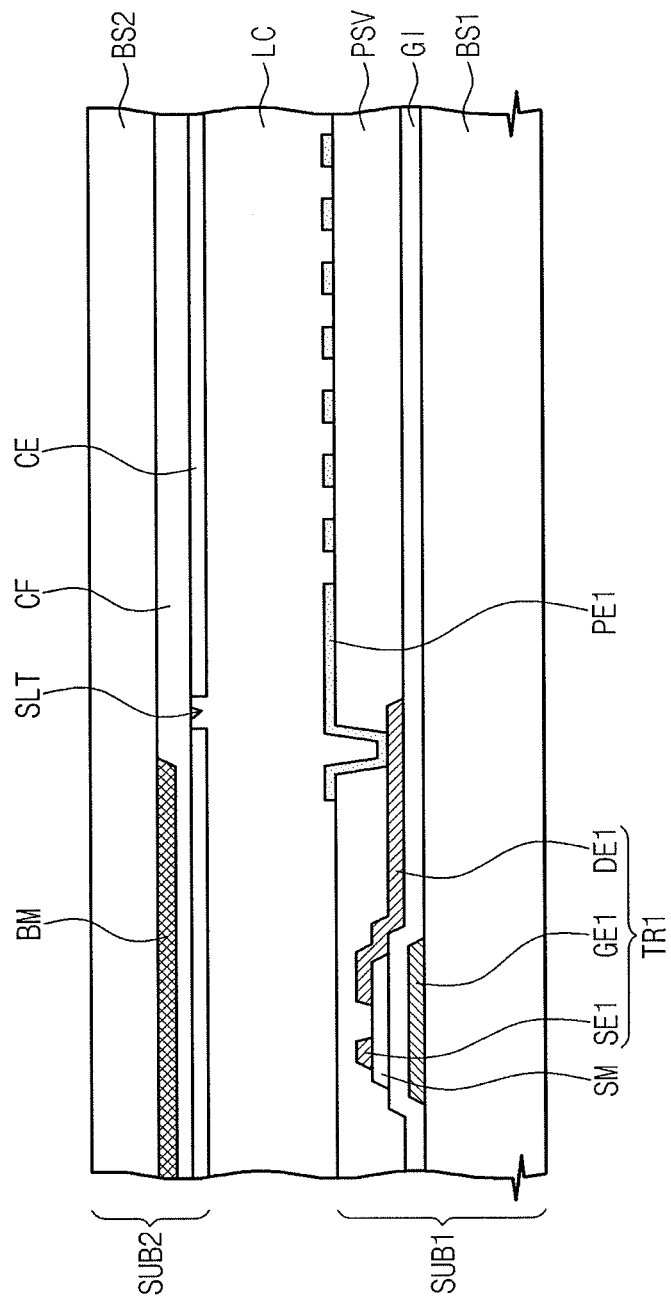
FIG. 2 illustrates a cross-sectional view taken along a line I-I' shown in FIG. 1.
Figure 3:
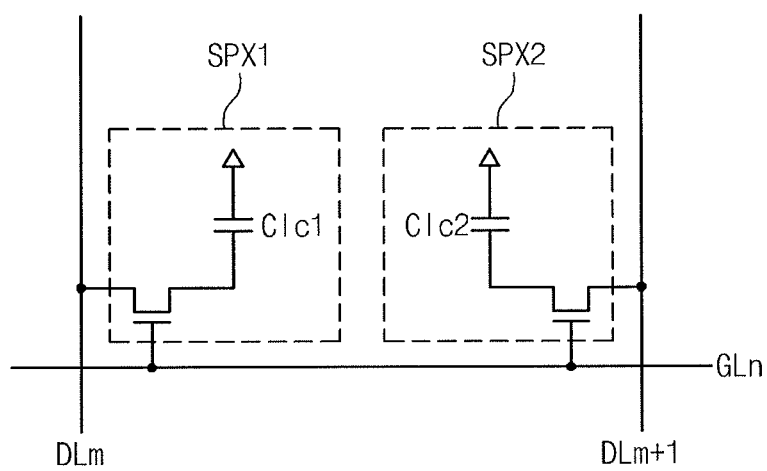
FIG. 3 illustrates an equivalent circuit diagram showing a pixel according to an exemplary embodiment of the present disclosure.

FIG. 1 illustrates a layout diagram showing a pixel according to an exemplary embodiment of the present disclosure, FIG. 2 illustrates a cross-sectional view taken along a line I-I' shown in FIG. 1, and FIG. 3 illustrates an equivalent circuit diagram showing a pixel according to an exemplary embodiment of the present disclosure.

Referring to FIGS. 1 to 3, a liquid crystal display may include a first substrate SUB1, a second substrate SUB2 facing the first substrate SUB1 while being coupled to the first substrate SUB1, and a liquid crystal layer LC interposed between the first substrate SUB1 and the second substrate SUB2.

The first substrate SUB1 may include a first base substrate BS1, a line part disposed on the first base substrate BS1, and a plurality of pixels PX connected to the line part. A plurality of pixel areas PA may be defined in the first base substrate SUB1 in a matrix form, and the pixels PX may be arranged in the pixel areas PA in a one-to-one correspondence.

The line part may include a plurality of gate lines and a plurality of data lines. For the convenience of explanation, FIGS. 1 and 2 show an n-th gate line GLn and an m-th data line DLm, an (m+1)th data line DLm+1, and one pixel PX. In the liquid crystal display according to the present exemplary embodiment, the other pixels may have substantially the same structure as the pixel PX. Hereinafter, the n-th gate line GLn will be referred to as a gate line, and the m-th and (m+1)th data lines DLm and DLm+1 will be referred to as first and second data lines, respectively.

The gate line GLn may extend in a first direction D1 and the first and second data lines DLm and DLm+1 may extend in a second direction D2 crossing the first direction D1. Hereinafter, for the convenience of explanation, a direction opposite to the first direction D1 is referred to as a third direction D3 and a direction opposite to the second direction D2 is referred to as a fourth direction D4. A direction inclined in a counter clockwise direction at an angle of about 45 degrees with respect to the first direction D1 is referred to as a fifth direction D5, a direction inclined in the counter clockwise direction at an angle of about 135 degrees with respect to the first direction D1 is referred to as a sixth direction fifth direction D6, a direction inclined in the counter clockwise direction at an angle of about 225 degrees with respect to the first direction D1 is referred to as a seventh direction fifth direction D7, and a direction inclined in the counter clockwise direction at an angle of about 315 degrees with respect to the first direction D1 is referred to as an eighth direction D8. In this case, two adjacent directions among the first to fourth directions D1, D2, D3, and D4 are substantially perpendicular to each other and two adjacent directions among the fifth to eighth directions D5, D6, D7, and D8 are substantially perpendicular to each other.

The first and second data lines DLm and DLm+1 may be disposed on a layer different from a layer on which the gate line GLn is disposed, and thus the first and second data lines DLm and DLm+1 may be insulated from the gate line GLn while crossing the gate line GLn.

The pixel PX may include thin film transistors connected to the line part and a pixel electrode connected to the thin film transistors. The thin film transistors may include a first thin film transistor TR1 and a second thin film transistor TR2, each being connected to a corresponding gate line and a corresponding data line of the line part. The pixel electrode may include a first sub-pixel electrode PE1 connected to the first thin film transistor TR1 and a second sub-pixel electrode PE2 connected to the second thin film transistor TR2.

The pixel PX may include a first sub-pixel SPX1 and a second sub-pixel SPX2. The first thin film transistor TR1 and the first sub-pixel electrode PE1 may form the first sub-pixel SPX1, and the second thin film transistor TR2 and the second sub-pixel electrode PE2 may form the second sub-pixel SPX.

The first thin film transistor TR1 may be connected to the first data line DLm and the gate line GLn. The first thin film transistor TR1 may include a first gate electrode GE1, a first source electrode SE1, and a first drain electrode DE1. The first gate electrode GE1 may be branched from the gate line GLn, and the first source electrode SE1 may be branched from the first data line DLm. The first source electrode SE1 and the first drain electrode DE1 may be connected to each other. A semiconductor layer SM, which forms a channel, may be disposed between the first source electrode SE1 and the first drain electrode DE1. The first drain electrode DE1 may be electrically connected to the first sub-pixel electrode PE1.

The first sub-pixel electrode PE1 may include a first trunk portion PE1a and a plurality of first branch portions PE1b connected to the first trunk portion PE1a when viewed in a plan view. The first trunk portion PE1a may include a cross portion PE1a1 having a cross shape extending in the first to fourth directions D1 to D4 and a plate portion PE1a2 having four sides, the plate portion being integrally formed as a single unitary and individual unit and disposed at a center portion of the cross portion PE1a1.

The pixel PX may include a plurality of domains defined by the cross portion PE1a1. In the present exemplary embodiment, the pixel PX includes four domains, i.e., first, second, third, and fourth domains DM1, DM2, DM3, and DM4. The first trunk portion PE1a and the first branch portions PE1b will be described in detail below.

The second sub-pixel SPX2 may include a second thin film transistor TR2 and a second sub-pixel electrode PE2.

The second thin film transistor TR2 of the second sub-pixel SPX2 may be connected to the second data line DLm+1 and the gate line GLn. The second thin film transistor TR2 may include a second gate electrode GE2, a second source electrode SE2, and a second drain electrode DE2. The second gate electrode GE2 may be branched from the gate line GLn and the second source electrode SE2 may be branched from the second data line DLm+1. The second source electrode SE2 and the second drain electrode DE2 may be connected to each other. A semiconductor layer, which forms a channel, may be disposed between the second source electrode SE2 and the second drain electrode DE2. The second drain electrode DE2 may be electrically connected to the second sub-pixel electrode PE2.

The second sub-pixel electrode PE2 may surround the first sub-pixel electrode PE1 when viewed in a plan view. The second sub-pixel electrode PE2 may include a second trunk portion PE2a, second branch portions PE2b protruding from one side of the second trunk portion PE2a, and third branch portions PE2c protruding from the other side of the second trunk portions PE2a. The second trunk portion PE2a and the second and third branch portions PE2b and PE2c will be described in detail below.

The first substrate SUB1 may include a gate insulating layer GI and a passivation layer PSV. Hereinafter, the first substrate SUB1 will be described in detail with reference to FIGS. 1 and 2.

The first and second gate electrodes GE1 and GE2 may be disposed on the first base substrate BS1. The first and second gate electrodes GE1 and GE2 may be branched from the gate line GLn. The first and second gate electrodes GE1 and GE2 may be covered by the gate insulating layer GI.

The first source electrode SE1 may be branched from the first data line DLm. The first drain electrode DE1 may be disposed to be spaced apart from the first source electrode SE1 by a predetermined distance on the first gate electrode GE1. A portion of the semiconductor layer SM may be disposed between the first source electrode SE1 and the first drain electrode DE1 when viewed in a plan view.

The second source electrode SE2 may be branched from the second data line DLm+1. The second drain electrode DE2 may be disposed to be spaced apart from the second source electrode SE2 by a predetermined distance on the second gate electrode GE2. A portion of the semiconductor layer may be disposed between the second source electrode SE2 and the second drain electrode DE2 when viewed in a plan view.

The gate insulating layer GI, the first and second source electrodes SE1 and SE2, the first and second drain electrodes DE1 and DE2, and the semiconductor layer SM may be covered by the passivation layer PSV. The passivation layer PSV may be provided with contact holes to respectively expose the first and second drain electrodes DE1 and DE2.

The pixel electrode may be disposed on the passivation layer PSV. When the pixel area PA has a rectangular shape, the pixel electrode may cover the rectangular shape. An area covered by the pixel electrode may have a rectangular shape having chamfered corners. The pixel electrode may include the first and second sub-pixel electrodes PE1 and PE2, which are electrically separated from each other. The first sub-pixel electrode PE1 may be electrically connected to the first thin film transistor TR1 and may receive a first data voltage output from the first thin film transistor TR1. The second sub-pixel electrode PE2 may be electrically connected to the second thin film transistor TR2 and may receive a second data voltage output from the second thin film transistor TR2. The second data voltage may have a lower voltage level than the first data voltage.

The second substrate SUB2 may include a second base substrate BS2, a black matrix BM, a color filter layer CF, and a common electrode CE. The second substrate SUB2 may face and be coupled to the first substrate SUB1.

The black matrix BM may include a light blocking material and may be disposed on the second base substrate BS2. The black matrix BM may be disposed to correspond to areas in which the gate line GLn, the first and second data lines DLm and DLm+1, and the first and second thin film transistors TR1 and TR2 are disposed. The black matrix BM may block light leaked through a peripheral area of the pixel area PA.

The color filter layer CF may include red, green, and blue color pixels, as examples. The color filter layer CF may include cyan, magenta, yellow, or black color pixels. The color pixels may be arranged to respectively correspond to the pixel area PA.

The common electrode CE may be disposed on the color filter layer CF and may have a uniform thickness. The common electrode CE may include a slit SLT formed therethrough. The slit SLT may correspond to the cross portion PE1a1 of the first sub-pixel electrode PE1 and may overlap with the cross portion PE1a1 when viewed in a plan view. The slit SLT may extend longer than the extending portion of the cross portion PE1a1.

The liquid crystal layer LC may be interposed between the first substrate SUB1 and the second substrate SUB2. Liquid crystal molecules of the liquid crystal layer LC may be aligned in different directions according to each domain.

Referring to FIG. 3 again, the first sub-pixel SPX1 may include the first thin film transistor TR1 and a first liquid crystal capacitor C1c1. The second sub-pixel PSX2 may include the second thin film transistor TR2 and a second liquid crystal capacitor C1c2.

The first and second thin film transistors TR1 and TR2 of the pixel PX may be turned on in response to the gate signal applied to the gate line GLn. The first data voltage applied to the first data line DLm may be applied to the first sub-pixel electrode PE1. Thus, the first liquid crystal capacitor C1c1 may be charged with the first data voltage. The second data voltage applied to the second data line DLm+1 may be applied to the second sub-pixel electrode PE2. Thus, the second liquid crystal capacitor C1c2 may be charged with the second data voltage. In the embodiment, the second data voltage may have a lower voltage level than the first data voltage. Thus, the second liquid crystal capacitor C1c2 may be charged with a pixel voltage lower than a pixel voltage charged in the first liquid crystal capacitor C1c1.

As described above, when the voltages applied to the first and second sub-pixel electrodes PE1 and PE2 are different from each other, an alignment of the liquid crystal molecules of the liquid crystal layer LC may be charged in the first and second pixel electrodes PE1 and PE2. As a result, different optical properties may appear in the areas corresponding to the first and second sub-pixel electrodes PE1 and PE2. A display image, e.g., a side viewing angle, of the liquid crystal display may be improved.

Figure 4:
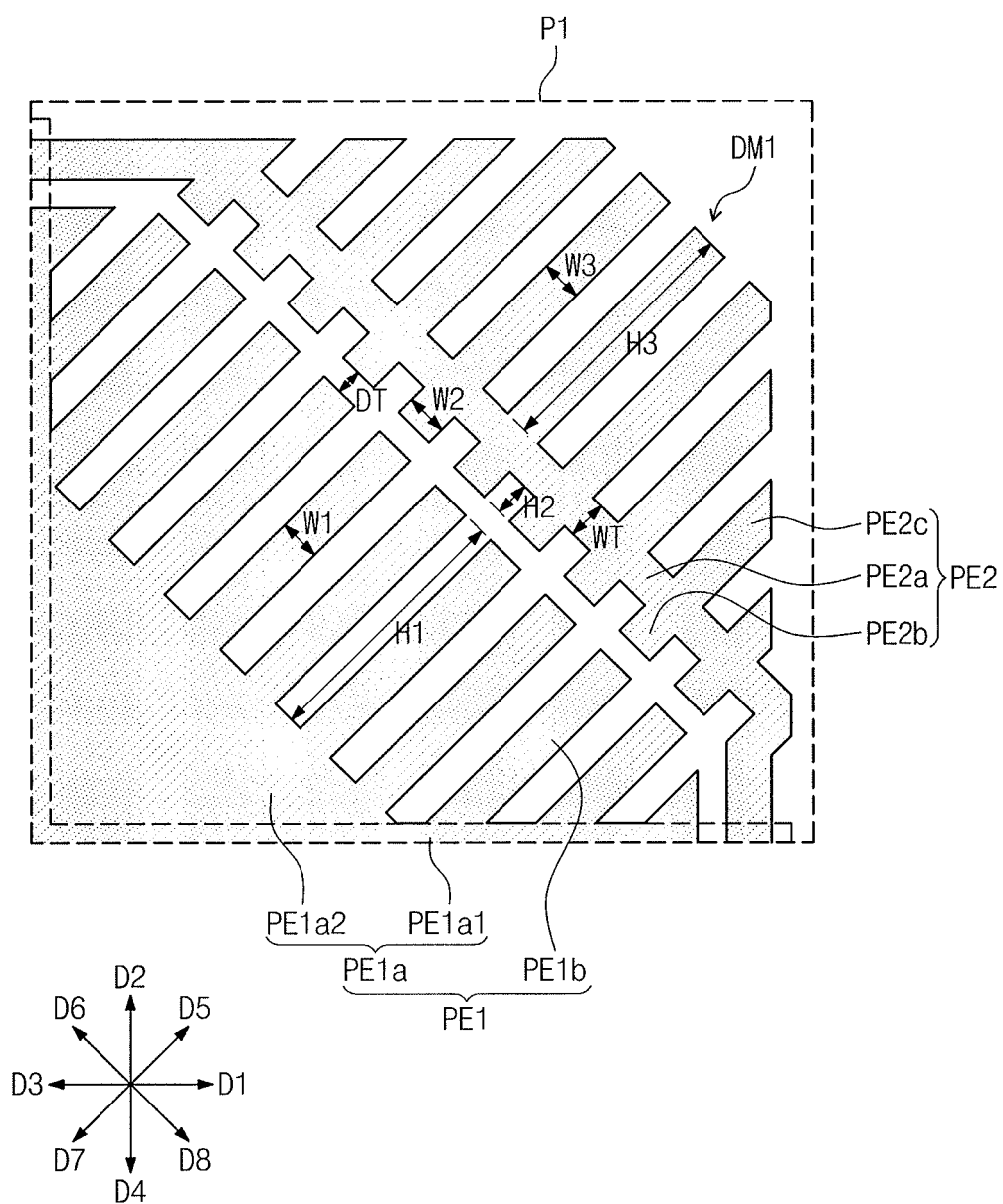
FIG. 4 illustrates an enlarged plan view showing a pixel electrode in a portion corresponding to a first domain.

FIG. 4 illustrates an enlarged plan view showing the pixel electrode in the portion corresponding to the first domain DM1.

Referring to FIGS. 1 and 4, the pixel electrode may include the first sub-pixel electrode PE1 and the second sub-pixel electrode PE2 spaced apart from the first sub-pixel electrode PE1 and surrounding the first sub-pixel electrode PE1.

The first sub-pixel electrode PE1 may include the first trunk portion PE1a and the first branch portions PE1b. The first trunk portion PE1a may include the cross portion PE1a1 extending in the first to fourth directions D1 to D4. As shown in FIG. 4, the cross portion PE1a1 may extend in the first and second directions D1 and D2 in the first domain DM1. The plate portion PE1a2 having a quadrangular shape defined by the four sides may be disposed at the center portion of the cross shape. The plate portion PE1a2 may have a rectangular shape or a square shape defined by two pairs of sides. Each pair may have adjacent sides that are equal in length and angles that are equal where pairs meet. An opening, e.g., the slit, may not be formed in the plate portion PE1a2. The four sides of the plate portion PE may be disposed to be inclined to the first to fourth directions D1 to D4 and be substantially in parallel to the fifth to eighth directions D5 to D8. For instance, one side of the plate portion PE1a2 may be disposed in a direction inclined to the first direction D1 or the second direction D2 in the first domain DM1, i.e., a direction substantially parallel to the sixth direction D6 or the eighth direction D8. In the embodiment, the cross portion PE1a1 may extend from four corners of the rectangular shape of the plate portion PE1a2.

The first branch portions PE1b may protrude from and extend from the four sides of the plate portion PE1a2. The first branch portions PE1b may be aligned in different directions according to the domains. The first branch portions PE1b may extend in directions, e.g., the fifth to eighth directions D5 to D8, each of which is substantially perpendicular to a corresponding side of the four sides. For instance, the first branch portions PE1b may extend in the fifth direction D5 in the first domain DM1 as shown in FIG. 4.

The first branch portions PE1b may be spaced apart from each other and may extend substantially in parallel to each other in the areas defined by the first trunk portion PE1a. Each of the first branch portions PE1a may have a length that varies depending on a shape of each domain and a position thereof in each domain. The distance between two adjacent first branch portions PE1b to each other may be measured in terms of micrometers. The first branch portions PE1b may be used to align the liquid crystal molecules of the liquid crystal layer in a specific azimuth on a plane surface substantially parallel to the first base substrate SUB1.

At least a portion of the second trunk portion PE2a may be disposed to correspond to each side of the plate portion PE and to be substantially parallel to each side of the plate portion PE1a2. The second trunk portion PE2a disposed between the domains adjacent to each other may be connected to another second trunk portion disposed between the domains adjacent to each other.

The second branch portions PE2b may protrude from and extend from one side of the second trunk portion PE2a. The second branch portions PE2b may have substantially the same length H2. The length H2 of the second branch portions PE2b may be shorter than a length H1 of the first branch portions PE1b.

The second branch portions PE2b may face the first branch portions PE1b in a one-to-one correspondence and extend in a direction opposite to the first branch portions PE1b. For instance, when the first branch portions PE1b extend in the fifth direction D5 in the first domain DM1, the second branch portions PE2b may extend in the seventh direction D7 in the first domain DM1.

End portions of the second branch portions PE2b may face end portions of the first branch portions PE1b in a one-to-one correspondence. A width W2 of the second branch portions PE2b may be substantially the same as a width W1 of the first branch portions PE1b. A distance DT between the end portion of the first branch portions PE1b and the end portion of the second branch portions PE2b may be equal to or smaller than the widths W1 and W2 of the first and second branch portions PE1b and PE2b.

The third branch portions PE2c may protrude from and extend from the other side of the second trunk portion PE2a. Each of the third branch portions PE2c may have a length H3 that is varied depending the shape of the domain and a position thereof in the domain. The length H3 of the third branch portions PE2c is longer than the length H2 of the second branch portions PE2b. Each of the third branch portions PE2c may have a width W3 substantially the same as the width W1 of the first branch portions PE1b and/or the width W2 of the second branch portions PE2b.

The third branch portions PE2c may be disposed to correspond to the second branch portions PE2b in a one-to-one correspondence and extend in a direction opposite to the direction in which the second branch portions PE2b extend, i.e., a direction substantially the same as the first branch portions PE1b. For instance, when the second branch portions PE2b extend in the seventh direction D7 in the first domain as shown in FIG. 4, the third branch portions PE2c may extend in the fifth direction D5.

Similar to the first branch portions PE1b, the second branch portions PE2b may be spaced apart from each other and extend substantially in parallel to each other in each domain, and the third branch portions PE2c may be spaced apart from each other and extend substantially in parallel to each other in each domain. The distance between two adjacent second branch portions PE2b to each other and the distance between the third branch portions PE2c may be measured in terms of micrometers. The second and third branch portions PE2*b* and PE2*c* may be used to align the liquid crystal molecules of the liquid crystal layer in a specific azimuth on a plane surface substantially parallel to the first base substrate SUB1.

In the liquid crystal display according to the above-mentioned structure, texture defects are reduced compared to a comparative liquid crystal display.

Figure 5A:
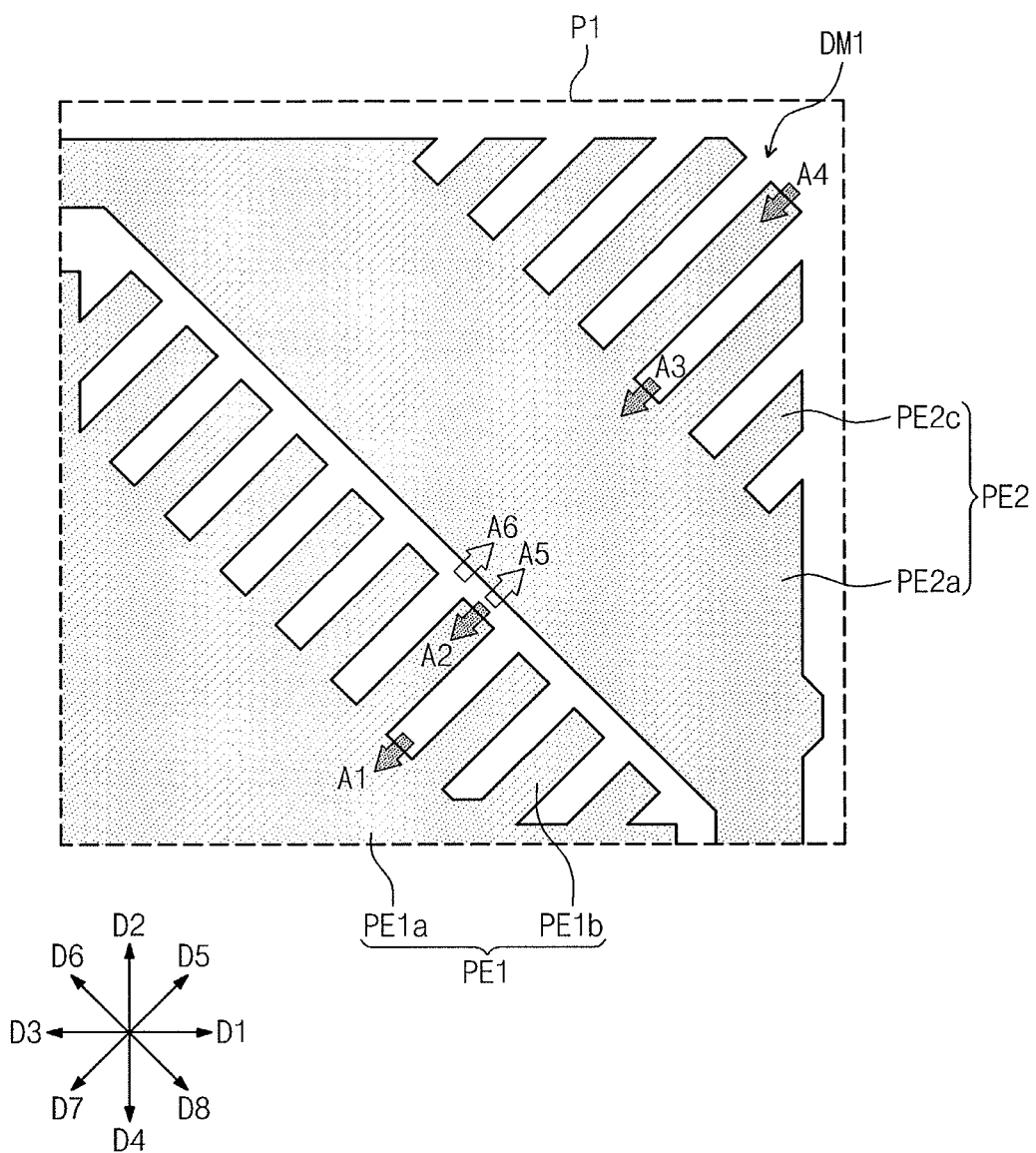
FIG. 5A illustrates a plan view showing a pixel electrode of a comparative liquid crystal display.
Figure 5B:
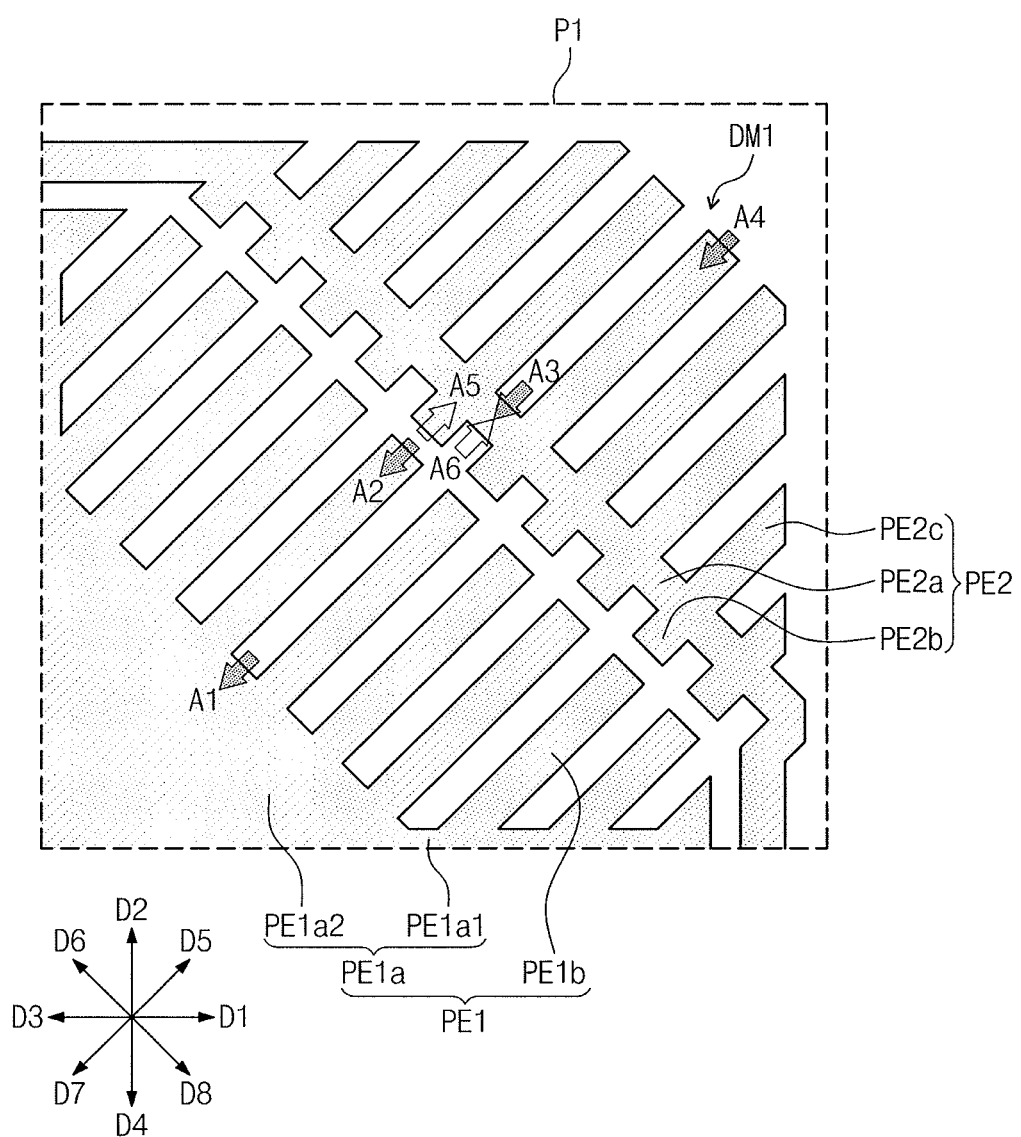
FIG. 5B illustrates a plan view showing a pixel electrode of a liquid crystal display according to an exemplary embodiment of the present disclosure.
Figure 6A:
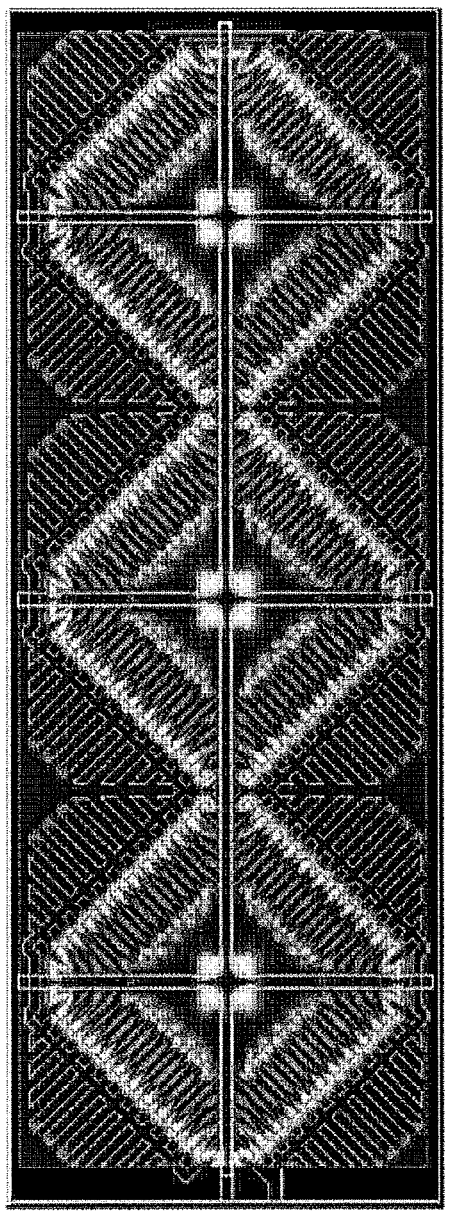
FIGS. 6A to 6D illustrate images showing simulation results of transmittance in three pixels each including first to fourth domains, which are sequentially arranged in a second direction.
Figure 6B:
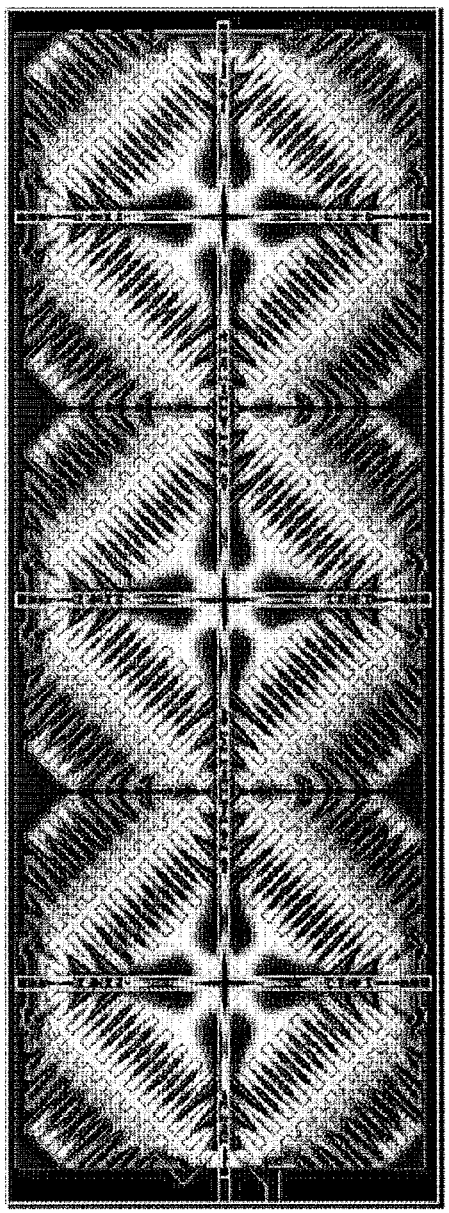
Figure 6C:
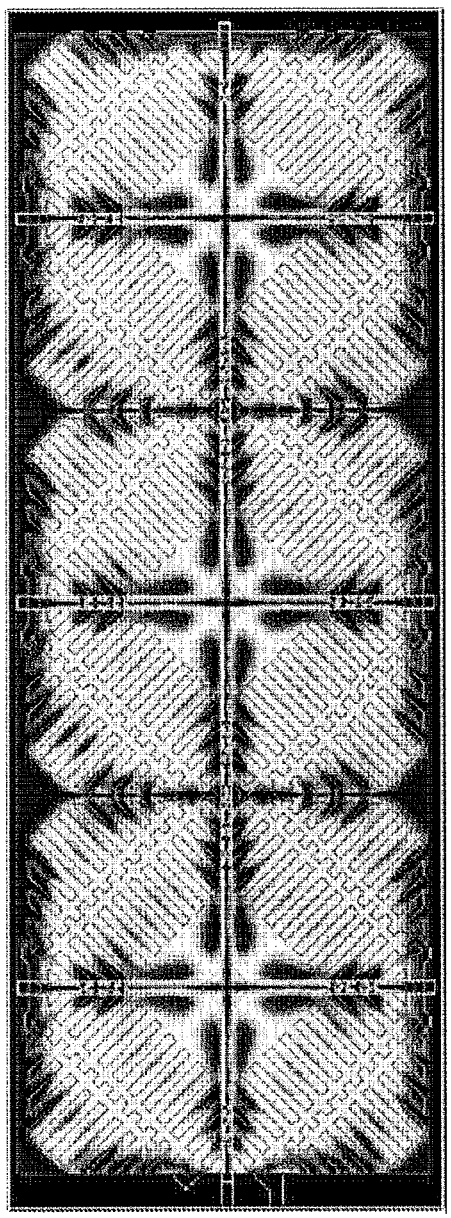
Figure 6D:
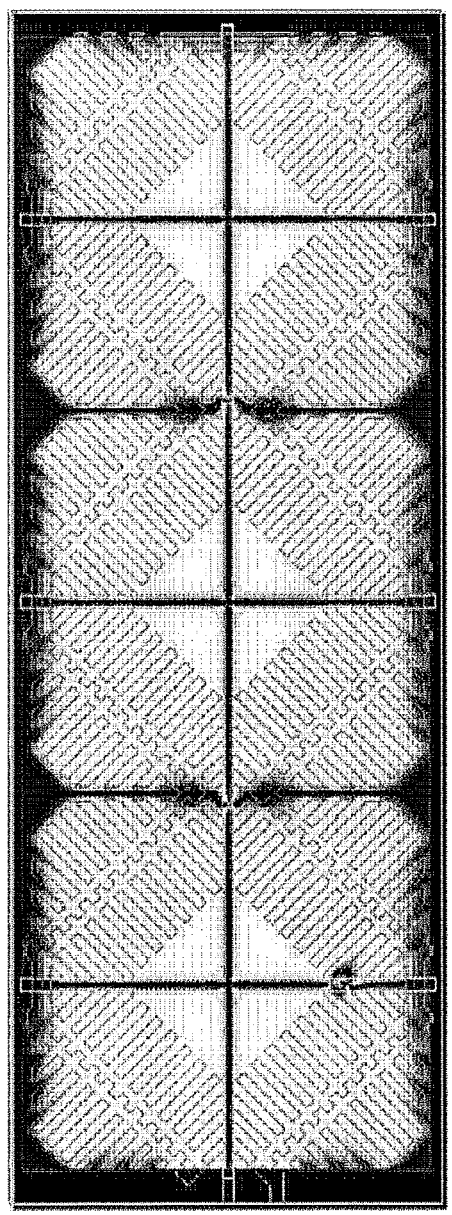

FIG. 5A illustrates a plan view showing a pixel electrode of a comparative liquid crystal display and FIG. 5B illustrates a plan view showing a pixel electrode of a liquid crystal display according to an exemplary embodiment of the present disclosure. FIGS. 5A and 5B show one domain, i.e., the first domain. Directions of forces applied to the liquid crystal molecules are represented by arrows when each pixel is turned on.

Referring to FIGS. 5A and 5B, a pixel electrode of the comparative liquid crystal display includes a first sub-pixel electrode PE1 and a second sub-pixel electrode PE2. The first sub-pixel electrode PE1 of the comparative liquid crystal display has the similar shape as that of the first sub-pixel electrode PE1 according to the present exemplary embodiment. However, the second sub-pixel electrode PE2 of the comparative liquid crystal display includes branch portions corresponding to the third branch portions PE2*c*, but does not include branch portions corresponding to the second branch portions PE2*b* extending toward the first branch portions PE1*b*. In addition, a trunk portion of the second sub-pixel electrode PE2 of the comparative liquid crystal display has a width greater than that of the second trunk portion PE2*a* according to the present exemplary embodiment. That is, the trunk portion of the second sub-pixel electrode PE2 of the comparative liquid crystal display has a plate shape integrally formed as a single unitary and individual unit.

Therefore, when the elements of the comparative liquid crystal display similarly correspond to the elements of the liquid crystal display according to the present exemplary embodiment of the present disclosure, the terms used to the liquid crystal display according to the present exemplary embodiment of the present disclosure are applied to the elements of the comparative liquid crystal display. For instance, the elements of the first sub-pixel electrode PE1 of the comparative liquid crystal display are referred to as a first trunk portion PE1*a* and first branch portions PE1*b* and the elements of the second sub-pixel electrode PE2 of the comparative liquid crystal display are referred to as a second trunk portion PE2*a* and third branch portions PE2*c*.

Referring again to FIG. 5A, when the pixel voltage is applied to the pixel electrode and the other elements of the comparative liquid crystal display are the same as the liquid crystal display according to the present exemplary embodiment, a fringe field is formed at the end portion of each of the branch portions of the pixel electrode such that the liquid crystal molecules are aligned in the electrode direction. The fringe field is formed at the slit of the common electrode such that the liquid crystal molecules are aligned in the slit direction. The force applied to the liquid crystal molecules by the fringe field and the direction of the force are represented by dark arrows A1, A2, A3, and A4. The liquid crystal molecules are aligned in the direction of the first trunk portion PE1*a*, i.e., a direction toward the center portion of the cross portion, by the fringe field. However, the fringe field is formed in a direction opposite to the movement of the liquid crystal molecules in the area near the second trunk portion PE2*a* adjacent to the first branch portions PE1*b*. The force applied to the opposite direction and the direction of the force is represented by white arrows A5 and A6. In the embodiment, the force represented by the arrow A2 in the area near the second trunk portion PE2*a* adjacent to the first branch portions PE1*b* is balanced by the force represented by the arrow A5 in the near area thereof, but the force represented by the arrow A6 exerts influence on the alignment of the liquid crystal molecules, since no force required to balance the force represented by the arrow A6 exists in the near area thereof. Thus, texture defects may occur on the liquid crystal molecules applied with the force acting in the opposite direction to the direction in which most of the liquid crystal molecules are aligned, as indicated by the white arrows.

Referring to FIG. 5B, in the liquid crystal display according to the present embodiment, the fringe field may be formed, as represented by the dark arrows A1 to A4, such that the liquid crystal molecules are aligned in the electrode direction at the end portion of each branch portion of the pixel electrode. Thus, the liquid crystal molecules may be aligned toward the center portion of the cross portion. In the liquid crystal display according to the present exemplary embodiment, the fringe field, as represented by the white arrows A5 and A6, may be formed in a direction opposite to the movement of most of the liquid crystal molecules in the area near the second trunk portion PE2*a* adjacent to the first branch portions PE1*b*. However, the force represented by the arrow A5 may be balanced by the force represented by the arrow A2 in the end portion of the adjacent first branch portions PE1*b*, and the force represented by the arrow A6 may be balanced by the force represented by the arrow A3 in the other side of the adjacent second trunk portion PE2*a*. Accordingly, texture defects may be prevented from occurring in the area near the second trunk portion PE2*a*.

In the present exemplary embodiment, the number of the domains may be increased or decreased in accordance with the shape of the pixel electrode. For instance, the first and second sub-pixel electrodes may be disposed to allow one pixel to have only the first domain, or the first and second sub-pixel electrodes may be disposed to allow one pixel to have plural domain units, each including the first, second, third, and fourth domains. In detail, three domain units, each including the first, second, third, and fourth domains, may be arranged in the second direction. In two domain units adjacent to each other, the first sub-pixel electrodes may be connected to each other and the second sub-pixel electrodes may be connected to each other. The first sub-pixel electrodes PE1 included in the three domain units may be driven by one first thin film transistor TR1, and the second sub-pixel electrodes PE2 included in the three domain units may be driven by one second thin film transistor TR2.

FIGS. 6A to 6D illustrate photographs showing simulation results of transmittance in three pixels each including the first to fourth domains, which are sequentially arranged in the second direction. FIGS. 6A to 6D show the transmittance in a time lapse of about 5 ms, about 10 ms, about 25 ms, and about 500 ms after the first and second thin film transistors are turned on in response to the gate signal.

Referring to FIGS. 6A to 6D, no texture defects appear between the first and second sub-pixel electrodes, e.g., at the area near the trunk portion of the second sub-pixel electrode. In addition, different from the comparative liquid crystal display, the transmittance between the first and second sub-pixel electrodes becomes higher than that of the other portions.

In the present exemplary embodiment, the one pixel is connected to one gate line and two data lines. In other implementations, one pixel may be connected to two gate lines and one data line, or to one gate line and one data line, and the pixel may have a resistance division circuit or a charge coupling circuit.

Figure 7:
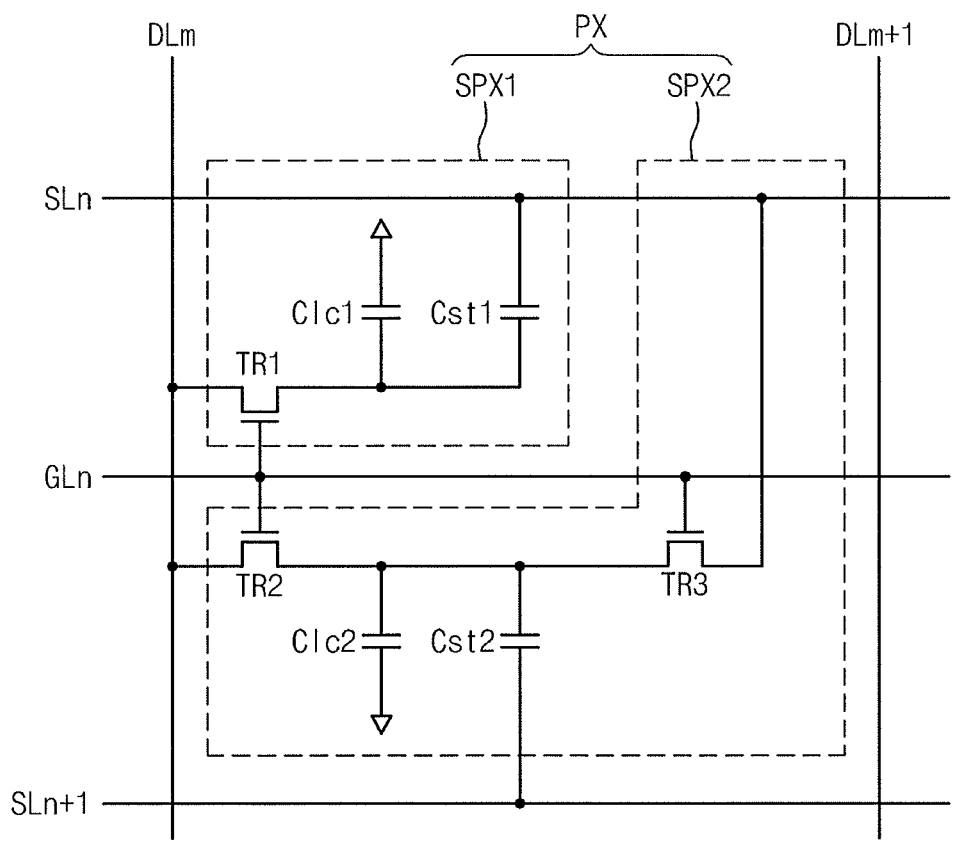
FIG. 7 illustrates an equivalent circuit diagram showing a liquid crystal display having a resistance division circuit.

FIG. 7 illustrates an equivalent circuit diagram showing a liquid crystal display having a resistance division circuit. In the liquid crystal display having the resistance division circuit according to this exemplary embodiment, a line part and a pixel may be partially different from the above-mentioned line part and the pixel, but the shape of the sub-pixel electrode in each pixel may be substantially the same as the above-mentioned sub-pixel electrode.

Referring to FIG. 7, each pixel PX may include a first sub-pixel SPX1 and a second sub-pixel SPX2. The first and second sub-pixels SPX1 and SPX2 may be disposed between two data lines DLm and DLm+1 (hereinafter, referred to as first and second data lines) adjacent to each other. The first sub-pixel SPX1 may include a first thin film transistor TR1, a first liquid crystal capacitor C1c1, and a first storage capacitor Cst1. The second sub-pixel SPX2 may include a second thin film transistor TR2, a second liquid crystal capacitor C1c2, a second storage capacitor Cst2, and a third thin film transistor TR3.

The first thin film transistor TR1 may be connected to the first data line DLm and the gate line GLn, the second thin film transistor TR2 may be connected to the first data line DLm and the gate line GLn, and the third thin film transistor TR3 may be connected to a first storage line SLn and the gate line GLn.

The first thin film transistor TR1 may include a source electrode connected to the first data line DLm, a first gate electrode connected to the gate line GLn, and a first drain electrode connected to the first liquid crystal capacitor C1c1. The first storage capacitor Cst1 may be disposed between the first drain electrode and the first storage line SLn and connected to the first liquid crystal capacitor C1c1 in parallel.

The second thin film transistor TR2 may include a second source electrode connected to the first data line DLm, a second gate electrode connected to the gate line GLn, and a second drain electrode connected to the second liquid crystal capacitor C1c2. The second storage capacitor Cst2 may be disposed between the second drain electrode and a second storage line SLn+1 and connected to the second liquid crystal capacitor C1c2 in parallel.

The third thin film transistor TR3 may include a third source electrode connected to the first storage line SLn, a third gate electrode connected to the gate line GLn, and a third drain electrode connected to the second liquid crystal capacitor C1c2.

When the gate signal is applied to the gate line GLn, the first, second, and third thin film transistors TR1, TR2, and TR3 may be substantially and simultaneously turned on. The data voltage applied to the first data line DLm may be applied to the first and second liquid crystal capacitors C1c1 and C1c2 through the turned-on first and second thin film transistors TR1 and TR2. In addition, a storage voltage applied to the first storage line SLn may be applied to the second liquid crystal capacitor C1c2 through the turned-on third thin film transistor TR3. A voltage at a contact point between the second and third thin film transistors TR2 and TR3 may correspond to a voltage divided by a resistance of the turn-on resistor of the second and third thin film transistors TR2 and TR3. The voltage at the contact point between the second and third thin film transistors TR2 and TR3 may have a voltage value corresponding to an intermediate value between the data voltage provided through the turned-on second thin film transistor TR2 and the storage voltage provided through the turned-on third thin film transistor TR3. Accordingly, after the gate signal is generated, the first liquid crystal capacitor C1c 1 may be charged with a first pixel voltage and the second liquid crystal capacitor C1c2 may be charged with a second pixel voltage smaller than the first pixel voltage.

Figure 8:
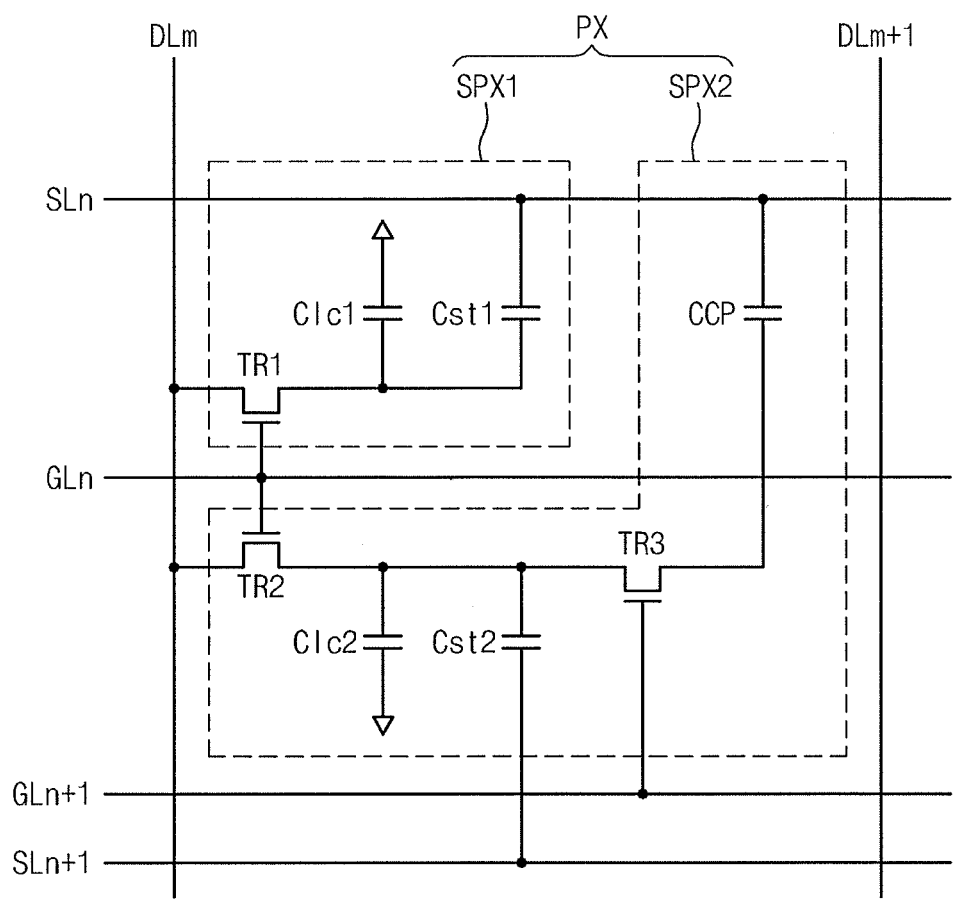
FIG. 8 illustrates an equivalent circuit diagram showing a liquid crystal display having a charge coupling circuit.

FIG. 8 illustrates an equivalent circuit diagram showing a liquid crystal display having a charge coupling circuit. In the liquid crystal display having the charge coupling circuit according to this exemplary embodiment, a line part and a pixel may be partially different from the above-mentioned line part and the pixel, but the shape of the sub-pixel electrode in each pixel may be substantially the same as the above-mentioned sub-pixel electrode. In addition, an n-th gate line GLn and an (n+1)th gate line GLn+1 are referred to as first and second gate lines GLn and GLn+1, respectively.

Referring to FIG. 8, each pixel PX may include a first sub-pixel SPX1 and a second sub-pixel SPX2. The first and second sub-pixels SPX1 and SPX2 may b disposed between two data lines DLm and DLm+1 (hereinafter, referred to as first and second data lines) adjacent to each other.

The first sub-pixel SPX1 may include a first thin film transistor TR1, a first liquid crystal capacitor C1c1, and a first storage capacitor Cst1. The second sub-pixel SPX2 may include a second thin film transistor TR2, a second liquid crystal capacitor C1c2, a second storage capacitor Cst2, a third thin film transistor TR3, and a coupling capacitor CCP.

The first thin film transistor TR1 may be connected to the first data line DLm and the first gate line GLn. The second thin film transistor TR2 may be connected to the first data line DLm and the gate line GLn.

The first thin film transistor TR1 may include a source electrode connected to the first data line DLm, a first gate electrode connected to the gate line GLn, and a first drain electrode connected to the first liquid crystal capacitor C1c1. The first storage capacitor Cst1 may be disposed between the first drain electrode and the first storage line SLn and may be connected to the first liquid crystal capacitor C1c1 in parallel.

The second thin film transistor TR2 may include a second source electrode connected to the first data line DLm, a second gate electrode connected to the gate line GLn, and a second drain electrode connected to the second liquid crystal capacitor C1c2. The second storage capacitor Cst2 may be disposed between the second drain electrode and the second storage line SLn+1 and may be connected to the second liquid crystal capacitor C1c2 in parallel When a first gate signal is applied to the first gate line GLn, the first and second thin film transistors TR1 and TR2 may be substantially and simultaneously turned on. The data voltage applied to the first data line DLm may be applied to the first and second liquid crystal capacitors C1c1 and C1c2 through the turned-on first and second thin film transistors TR1 and TR2. Therefore, the first and second liquid crystal capacitors C1c1 and C1c2 may be charged with the same data voltage during a high period of the first gate signal.

The third thin film transistor TR3 may include a third source electrode connected to the second drain electrode of the second thin film transistor TR2, a third gate electrode connected to the second gate line GLn+1, and a third drain electrode connected to the coupling capacitor CCP. The second gate line GLn+1 may receive a second gate signal that rises after the first gate signal falls. When the third thin film transistor TR3 is turned on in response to the second gate signal, a voltage division may occur between the second liquid crystal capacitor C1c2 and the coupling capacitor CCP. Thus, the data voltage charged in the second liquid crystal capacitor $C1c2$ may become low. The lowering of the data voltage may be changed depending on a charge rate of the coupling capacitor CCP. Consequently, after the second gate signal is generated, the first liquid crystal capacitor $C1c1$ may be charged with a first pixel voltage and the second liquid crystal capacitor $C1c2$ may be charged with a second pixel lower than the first pixel voltage.

As described with reference to FIGS. 7 and 8, the liquid crystal molecules in the area corresponding to the first sub-pixel electrode PE1 may be influenced by an electric field that is different from the electric field exerting influence on the liquid crystal molecules in the area corresponding to the second sub-pixel electrode PE2. Accordingly, the liquid crystal molecules in the area corresponding to the first sub-pixel electrode PE1 may be inclined at an angle different from an angle at which the liquid crystal molecules in the area corresponding to the second sub-pixel electrode PE2 are inclined. Therefore, the liquid crystal molecules in the area corresponding to the first sub-pixel electrode PE1 may have an inclination angle different from an inclination angle of the liquid crystal molecules in the area corresponding to the second sub-pixel electrode PE2. A phase delay of the light may be compensated, thereby improving the side visibility. The liquid crystal molecules in the two areas may form a plurality of domains having different alignment degrees toward the vertical direction, such that the side visibility may be improved.

By way of summation and review, in order to widen a viewing angle of a liquid crystal display, each pixel may be divided into plural domains. A pixel electrode and/or a common electrode may include(s) slits to form the domains. However, when the slits are formed in the pixel electrode, texture defects may occur.

According to the liquid crystal display, the texture defects may be prevented from occurring in the liquid crystal display and the visibility of the liquid crystal display may be improved, thereby improving display quality of the liquid crystal display. In addition, liquid crystal directors may be controlled by domains having different directions, and thus the visibility of the pixel may be improved. Further, the pixel may include first and second sub-pixels charged with different voltages, and thus the visibility of the liquid crystal display may be improved over the whole gray scales.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof the as set forth in the following claims.

What is claimed is:

1. A liquid crystal display including a pixel that includes a first sub-pixel chargeable with a first voltage and a second sub-pixel chargeable with a second voltage different from the first voltage, the liquid crystal display comprising: a pixel electrode that includes a first sub-pixel electrode in the first sub-pixel and a second sub-pixel electrode in the second sub-pixel; a common electrode that faces the pixel electrode; and a liquid crystal layer between the pixel electrode and the common electrode, wherein: the first sub-pixel electrode includes a first trunk portion and a plurality of first branch portions protruding from and extending from one side of the first trunk portion, the second sub-pixel electrode includes a second trunk portion and a plurality of second and third branch portions that protrude from both sides of the second trunk portion and extend substantially parallel to the first branch portions, and the second sub-pixel electrode substantially surrounds the first sub-pixel electrode.

2. The liquid crystal display as claimed in claim 1, wherein the second branch portions have a length shorter than a length of the third branch portions.

3. The liquid crystal display as claimed in claim 1, wherein end portions of the first branch portions face end portions of the second branch portions in a one-to-one correspondence.

4. The liquid crystal display as claimed in claim 3, wherein each of the second branch portions has a length shorter than a length of a corresponding first branch portion of the first branch portions.

5. The liquid crystal display as claimed in claim 1, wherein a width of the second trunk portion is equal to a length of each of the second branch portions.

6. The liquid crystal display as claimed in claim 5, wherein the second trunk portion extends in a direction crossing the second and third branch portions.

7. The liquid crystal display as claimed in claim 1, wherein the first voltage has a voltage level higher than a voltage level of the second voltage.

8. The liquid crystal display as claimed in claim 1, wherein:
the pixel includes a plurality of domains having different alignment directions of liquid crystal molecules of the liquid crystal layer, and
the first, second, and third branch portions extend in different directions according to each domain.

9. The liquid crystal display as claimed in claim 8, wherein:
the domains include first, second, third, and fourth domains, and
first, second, and third branch portions of each of the first, second, third, and fourth domains extend in first, second, third, or fourth directions different from each other.

10. The liquid crystal display as claimed in claim 9, wherein the first trunk portion includes a cross portion having a cross shape and a plate portion having a quadrangular shape with four sides substantially perpendicular to the first, second, third, and fourth directions, respectively.

11. The liquid crystal display as claimed in claim 10, wherein the common electrode includes a slit having a cross shape.

12. The liquid crystal display as claimed in claim 11, wherein the slit overlaps with the cross portion of the first trunk portion when viewed in a plan view.

13. The liquid crystal display as claimed in claim 9, wherein the second sub-pixel electrode surrounds at least a portion of the first sub-pixel electrode.

14. The liquid crystal display as claimed in claim 13, wherein the first and second sub-pixel electrodes cover at least a portion of a quadrangular shape having chamfered corners.

15. The liquid crystal display as claimed in claim 9, wherein:
the first, second, third, and fourth domains form one domain unit, and the domain unit is provided in a plural number in one pixel.

16. The liquid crystal display as claimed in claim 1, further comprising:
   a plurality of gate lines; and
   a plurality of data lines,
   wherein the pixel is connected to a corresponding gate line of the gate lines and a corresponding data line of the data lines.

17. The liquid crystal display as claimed in claim 16, wherein the pixel includes:
   a first thin film transistor that applies the first voltage to the first sub-pixel electrode; and
   a second thin film transistor that applies the second voltage to the second sub-pixel electrode, the first thin film transistor being connected to one gate line of the gate lines and one data line of the data lines, and the second thin film transistor being connected to the one gate line of the gate lines and another data line of the data lines, the another data line being not connected to the first thin film transistor.

18. The liquid crystal display as claimed in claim 1, wherein:
   the first sub-pixel includes a first thin film transistor to apply a first data voltage to the first sub-pixel electrode and a first liquid crystal capacitor connected to the first thin film transistor,
   the second sub-pixel includes a second thin film transistor to apply a second data voltage to the second sub-pixel, a second liquid crystal capacitor connected to the second thin film transistor, and a third thin film transistor substantially and simultaneously turned on with the second thin film transistor to apply a storage voltage to the second sub-pixel electrode, and
   the second sub-pixel electrode is applied with a voltage divided by a resistance of the turn-on resistor of the second and third thin film transistors.

19. The liquid crystal display as claimed in claim 1, wherein:
   the first sub-pixel includes a first thin film transistor to apply a first pixel voltage to the first sub-pixel electrode and a first liquid crystal capacitor connected to the first thin film transistor, and
   the second sub-pixel includes a second thin film transistor to apply a second pixel voltage to the second sub-pixel, a second liquid crystal capacitor connected to the second thin film transistor, a third thin film transistor turned on at a different time point from the second thin film transistor, and a coupling capacitor electrically connected to the second liquid crystal capacitor when the third thin film transistor is turned on to lower a voltage charged in the second liquid crystal capacitor.

\* \* \* \* \*